(12) United States Patent
Koeten et al.

(10) Patent No.: US 8,813,174 B1
(45) Date of Patent: Aug. 19, 2014

(54) EMBEDDED SECURITY BLADES FOR CLOUD SERVICE PROVIDERS

(75) Inventors: Robert Koeten, Menlo Park, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 33 days.

(21) Appl. No.: 13/341,202

(22) Filed: Dec. 30, 2011

Related U.S. Application Data (60) Provisional application No. 61/482,192, filed on May 3, 2011.

(51) Int. Cl.
*H04L 9/00* (2006.01)
*H04L 12/24* (2006.01)

(52) U.S. Cl.
CPC .......... *H04L 41/022* (2013.01); *H04L 41/0226* (2013.01); *H04L 41/0253* (2013.01); *H04L 41/22* (2013.01)
USPC ............ 726/1; 726/2; 726/3; 726/12; 726/18; 713/152; 713/155; 713/168; 709/223; 709/250

(58) Field of Classification Search
CPC . H04L 63/20; H04L 41/0226; H04L 41/0253; H04L 41/22
USPC .............. 726/1–3, 12, 18; 713/152, 155, 168; 709/223, 250
See application file for complete search history.

(56) References Cited

U.S. PATENT DOCUMENTS

| | | | |
|---|---|---|---|
| 7,734,045 B2 | 6/2010 | Sandhu et al. | |
| 7,870,294 B2 | 1/2011 | Braddy et al. | |
| 8,079,066 B1 | 12/2011 | Cordell et al. | |
| 8,285,681 B2 * | 10/2012 | Prahlad et al. | ........... 707/640 |
| 8,312,270 B1 | 11/2012 | Chou et al. | |
| 8,544,058 B2 | 9/2013 | Lim | |
| 2004/0039945 A1 | 2/2004 | Oda | |
| 2006/0156385 A1 | 7/2006 | Chiviendacz et al. | |
| 2006/0182276 A1 | 8/2006 | Sandhu et al. | |
| 2007/0088683 A1 | 4/2007 | Feroglia et al. | |
| 2007/0136573 A1 | 6/2007 | Steinberg | |
| 2007/0214126 A1 | 9/2007 | Kikinis | |
| 2008/0077982 A1 | 3/2008 | Hayler et al. | |
| 2008/0181399 A1 | 7/2008 | Weise et al. | |
| 2008/0222707 A1 | 9/2008 | Pahturi et al. | |
| 2009/0199277 A1 | 8/2009 | Norman et al. | |
| 2009/0249439 A1 | 10/2009 | Olden et al. | |
| 2009/0300706 A1 | 12/2009 | Ray et al. | |
| 2010/0030746 A1 | 2/2010 | Steelberg et al. | |

(Continued)

OTHER PUBLICATIONS

Check Point Introduces New Line of Security Management Appliance Based on the Software blade Architecture , May 26, 2009, http://www.checkpoint.com/press/2009/s,art-1052609.html.*

(Continued)

*Primary Examiner* — Kambiz Zand
*Assistant Examiner* — Tongoc Tran
(74) *Attorney, Agent, or Firm* — Lowenstein Sandler LLP (57) ABSTRACT

A policy manager generates a uniform cloud service and information security policy based on a plurality of access contexts. The policy manager distributes the uniform cloud service and information security policy to a plurality of security blades, the security blades located within a plurality of cloud services and configured to control access for a user device to the cloud services and the information contained therein based on the uniform cloud service and information security policy.

17 Claims, 8 Drawing Sheets

(56) References Cited

U.S. PATENT DOCUMENTS

| | | | |
|---|---|---|---|
| 2010/0082713 A1* | 4/2010 | Frid-Nielsen et al. | 707/821 |
| 2010/0146583 A1 | 6/2010 | Prehofer et al. | |
| 2010/0192196 A1* | 7/2010 | Lee | 726/1 |
| 2010/0202609 A1 | 8/2010 | Sandhu et al. | |
| 2011/0113471 A1 | 5/2011 | Hjelm et al. | |
| 2011/0196751 A1 | 8/2011 | Steelberg et al. | |
| 2011/0209195 A1 | 8/2011 | Kennedy | |
| 2012/0023554 A1* | 1/2012 | Murgia et al. | 726/4 |
| 2012/0023556 A1 | 1/2012 | Schultz et al. | |
| 2012/0023568 A1 | 1/2012 | Cha et al. | |
| 2012/0131336 A1 | 5/2012 | Price et al. | |
| 2012/0222084 A1* | 8/2012 | Beaty et al. | 726/1 |
| 2012/0272249 A1* | 10/2012 | Beaty et al. | 719/318 |
| 2012/0297190 A1 | 11/2012 | Shen et al. | |

OTHER PUBLICATIONS

Imprivata, Inc., Imprivata OneSign® Release 4.1, A Platform Overview, 2008, pp. 1-36.

Citrix, Thread: Two factor authentication based on source IP address, Oct. 14-15, 2010, http://forums.citrix.com/message.jspa?messageID=1502780.

SonicWall, Inc., SonicWall Aventail, Eclass Secure Remote Access Installation and Administration Guide Version 10.5, Dec. 3, 2009.

Wikipedia, Apple ID, http://en.wikipedia.org/wiki/Apple_ID, retrieved Nov. 2, 2012.

USPTO, Office Action for U.S. Appl. No. 13/341,197, mailed Jun. 25, 2013.

USPTO, Office Action for U.S. Appl. No. 13/341,205, mailed Apr. 5, 2013.

USPTO, Office Action for U.S. Appl. No. 13/341,197, mailed Oct. 15, 2013.

USPTO, Office Action for U.S. Appl. No. 13/341,205, mailed Oct. 23, 2013.

USPTO, Office Action for U.S. Appl. No. 13/463,664, mailed Dec. 4, 2013.

USPTO, Office Action for U.S. Appl. No. 13/463,672, mailed Aug. 8, 2013.

\* cited by examiner

EMBEDDED SECURITY BLADES FOR CLOUD SERVICE PROVIDERS

RELATED APPLICATIONS

This application is related to and claims the benefit of U.S. Provisional Patent Application No. 61/482,192, filed May 3, 2011, which is hereby incorporated by reference herein.

FIELD

Embodiments of the invention relate to computer security, and in particular to embedded security blades for cloud service providers.

BACKGROUND

Organizations may offer one or more cloud services to users over a network (e.g., the Internet). The cloud services may include computation, software, data access, storage services, etc. that physically reside elsewhere (e.g., another computer or the organizations data center) which users can access from their own computer or device over a network. Since sensitive information may be sent to or received from these cloud services, corporate policy may limit access to cloud services depending on the user, device, network, etc. Conventionally, information security and protection is integrated deep within the cloud service applications. Configuration and maintenance of the security policies may be burdensome and possibly inconsistent with cloud service access policies (e.g., governance, risk management and compliance (GRC) policies) set for other cloud services. Thus, cloud service providers are not able to control and validate governance and compliance in a consistent and uniform fashion.

SUMMARY

A method and apparatus for embedded security blades for cloud service providers are described. In one embodiment, a policy manager generates a uniform cloud service access policy based on a plurality of access contexts. The policy manager distributes the uniform cloud service access policy to a plurality of security blades, the security blades located within a plurality of cloud services and configured to provide access for a user device to the cloud services based on the uniform cloud services access policy. The access may include overall access to the service itself or granular access to information sent to or from the service.

In one embodiment, the plurality of cloud services may include at least one of public cloud services and private cloud services. The policy manager distribute the uniform cloud service access policy to the public cloud services and private cloud services by providing a common application programming interface (API) to the plurality of security blades. In one embodiment, the plurality of access contexts on which the uniform cloud service access policy is based includes at least one of an identity of a user making the request, a type of the user device, a type of network over which the request was received, and a type of information requested. These contexts or thresholds for these contexts as used in the policy descriptors, may be received from a system administrator. Upon receiving the cloud service access policy, the security blade may receive, from a user device, a request to access a cloud service. The security blade compares a feature of the request to an access policy for the cloud service. If the feature satisfies a condition of the access policy, the security blade grants the user device access to the cloud service.

In addition, a system for embedded security blades for cloud service providers is described. An exemplary system may include a memory and a processor coupled with the memory. In one embodiment, the processor is to generate a uniform cloud service access policy based on a plurality of access contexts. The processor may distribute the uniform cloud service access policy to a plurality of security blades, the security blades located within a plurality of cloud services and configured to provide access for a user device to the cloud services based on the uniform cloud services access policy.

Further, a computer-readable storage medium network for embedded security blades for cloud service providers is described. An exemplary computer readable storage medium provides instructions, which when executed by a processor causes the processor to perform a method such as the exemplary methods discussed above.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for embedded security blades for cloud service providers. In one embodiment, a policy manager generates a uniform cloud service access policy based on a plurality of access contexts. The policy manager distributes the uniform cloud service access policy to a plurality of security blades, the security blades located within a plurality of cloud services and configured to provide access for a user device to the cloud services based on the uniform cloud services access policy.

In one embodiment, security blades may be software components embedded within a cloud service or may be included in a cloud service as a plug-in. As a plug-in, the security blades may add particular security and policy enforcement functions to the cloud service. The security blades may be created by the service provider that developed or manages the cloud service or by some other developer. The security blades may implement security features that are not part of the underlying cloud service where they are located. The security blades may receive uniform cloud service and information access policies from the policy manager which distributes the same policies to all security blades in the system. This allows for uniform access decisions while at the same time, distributing the decision making and enforcement process so as to alleviate bottlenecking at other points in the network. Cloud service providers can control and drive their access policies from a central cloud service policy manager, while getting the benefit of provider-side security and protection enforcement for improved security, performance and scale.

Figure 1:
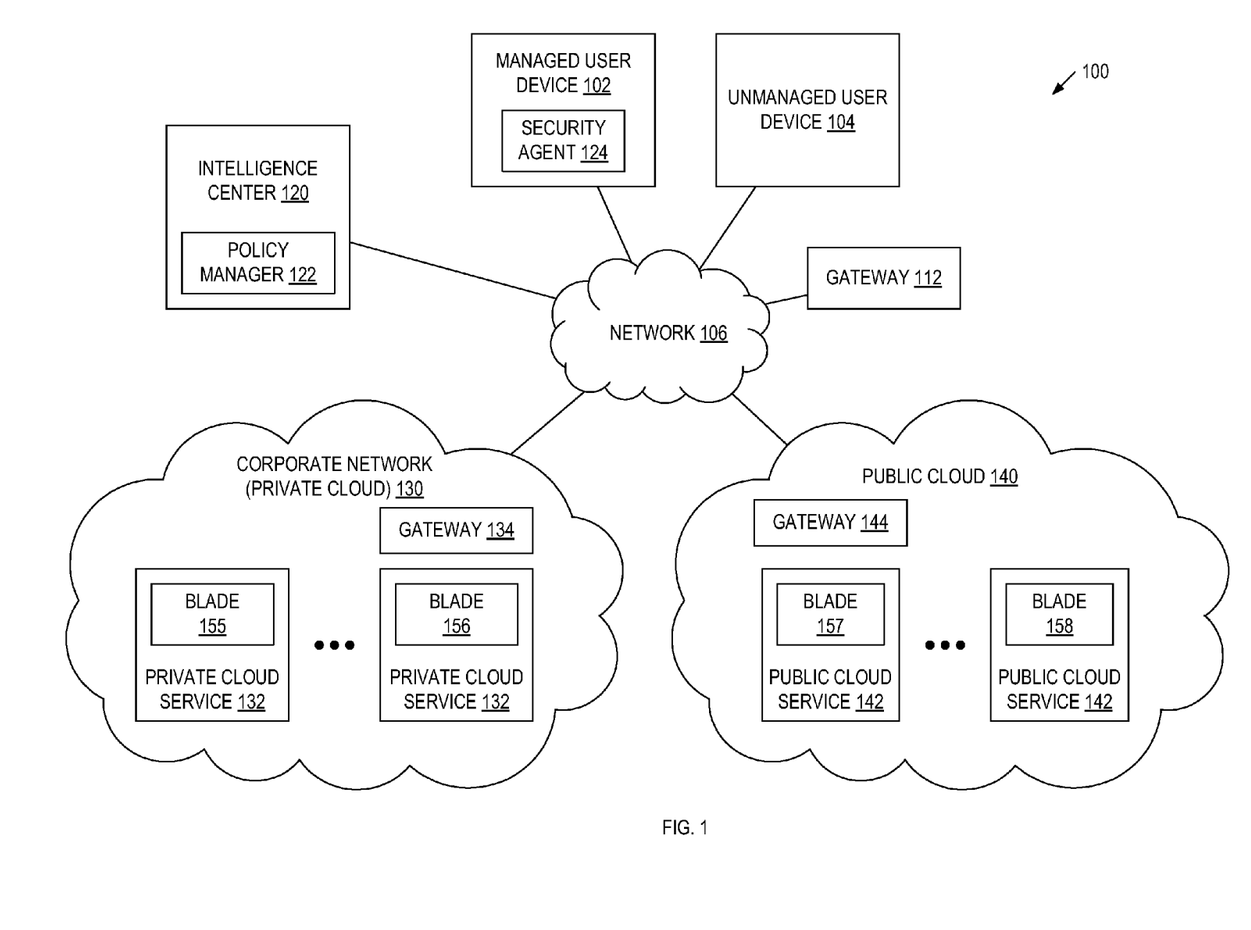
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include corporate network (i.e., private cloud) 130, public cloud 140 (including services not managed by the corporation and included in private cloud 130) and one or more user devices 102, 104 capable of communicating with the corporate network 130 and public cloud 140 via a network 106. Network 106 may include, for example, a private network such as a local area network (LAN), a wide area network (WAN), a global area network (GAN) such as the Internet, or a combination of such networks, and may include a wired or wireless network.

The user devices 102, 104 may be portable computing devices such as laptop or tablet computers. Other examples of portable computing devices include cellular telephones (e.g., smartphones), personal digital assistants (PDAs), portable media players, netbooks, and the like. The user devices 102, 104 may also be non-portable computing devices such as desktop computers, set-top boxes associated with a television, gaming consoles, and so on. The user devices 102, 104 may be variously configured with different features to enable access to the various cloud services 132, 142 made available by corporate network 130 and public cloud 140.

In one embodiment, the user devices are categorized as managed user devices 102 and unmanaged user devices 104. Managed user devices 102 may include devices provided by the organization or corporation that manages corporate network 130. For example, if a user is an employee of a corporation, the corporation may issue the employee a laptop computer and a smartphone. These devices may or may not be owned by the corporation, but as long as the corporation maintains an element of control over the devices, they may qualify as managed user devices 102. In some embodiments, the corporation may have control over what applications or programs are installed and run on managed user devices 102. For example, managed user devices 102 may have a security agent 124 installed thereon to monitor data sent to and from the managed user device 102, to encrypt or decrypt data transmissions, identify threats or suspicious behavior, etc. In other embodiments, the corporation may exert other forms of control over managed user devices 102.

Unmanaged user devices 104 include all other user devices that do not qualify as managed user devices 102. Unmanaged user devices 104 may include personal devices owned by the user or employee. For example, unmanaged user devices 104 may include a user's home computer or personal cell phone. Generally, the corporation has no control over what applications and programs are installed and run on unmanaged user devices 104, and unmanaged user devices 104 would not typically include security or data loss prevention software, such as security agent 124. In some embodiments, both managed user devices 102 and unmanaged user devices 104 may be used to access various available cloud services.

Cloud computing may refer to the access of computing resources over a computer network. A common shorthand for a cloud computing service (or an aggregation of all existing cloud services) is "the cloud." Cloud computing allows for a functional separation between the computing resources used and the physical machine where the user is working. The computing resources may reside in a local network or outside the local network, for example, in an internet connected datacenter. A user may access the resources in the cloud (e.g., corporate network 130 or public cloud 140) using a personal computer (PC), workstation, laptop computer, mobile phone, personal digital assistant (PDA), tablet computer, or the like, including managed user device 102 and unmanaged user device 104. The principle behind the cloud is that any computer connected to the Internet, or other network, is connected to the same pool of computing power, applications, and files. For example, users can store and access personal files, such as music, pictures, videos, and bookmarks, play games, or use productivity applications and cloud services on a remote server rather than physically carrying around a storage medium such as a DVD or hard drive.

Since the cloud is the underlying delivery mechanism, cloud based applications and services may support any type of software application or service in use today. All of the development and maintenance tasks involved in provisioning the applications are performed by a service provider (e.g., the corporation). The user's computer may contain very little software or data (perhaps a minimal operating system and web browser only), serving as little more than a display terminal for processes occurring on a network of computers, potentially located far away. Cloud computing frees users from certain hardware and software installation and maintenance tasks through the use of simpler hardware that accesses a vast network of computing resources (processors, servers, data storage devices, etc.). The sharing of resources reduces the cost to individuals and users may routinely use data intensive applications and services driven by cloud technology which were previously unavailable due to cost and deployment complexity.

Corporate network 130 and public cloud 140 may each include a group of networked computing resources accessible to the user devices 102, 104 over network 106. The resources available in corporate network 130 and public cloud 140 may include, for example, processing devices, storage devices, applications, or other resources. In one embodiment corporate network 130 may be a private cloud that is operated solely for a single organization, such as a corporation. Corporate network 130 may be managed internally by the corporation or by a third-party, and may be hosted internally or externally. Public cloud 140 may represent cloud computing in the more traditional sense, where resources are dynamically provisioned to the general public on a fine-grained, self service basis. Public cloud 140 may provide services and resources from a variety of service providers and may be jointly managed by the providers or managed by a third-party.

In one embodiment, corporate network 130 may include one or more private cloud services 132. Private cloud services 132 may include applications or programs made available to users of user devices 102, 104. Private cloud services 132 may include services created by the organization that manages corporate network 130 (e.g., the corporation) and/or services created by a third party, but provided and managed by the corporation for its users (e.g., employees). Private cloud services 132 may include, for example, an email service, a document management service, a customer relationship management (CRM) service, a video communication service, or some other cloud service. Select users may be afforded access to private cloud services 132 in corporate network 130 using managed user devices 102 or unmanaged user devices 104 over network 106.

In one embodiment, public cloud 140 may include one or more public cloud services 142. Public cloud services 142 may include applications or programs made available to users of user devices 102, 104. Public cloud services 142 may include services created, provided and managed by a variety of different organizations or service providers. Each public cloud service 142 may be used by a user for either personal or business purposes, and some public cloud services 142 may be used for both purposes. Public cloud services 142 may include similar and/or different services as private cloud services 132, such as for example, an email service, a document management service, a social networking service, a customer relationship management (CRM) service, or some other cloud service. When compared to corporate network 130, a larger portion of users (or in one embodiment, all users of the Internet) may be afforded access to public cloud services 142 in public cloud 140 using managed user devices 102 or unmanaged user devices 104.

Network architecture 100 may also be designed with certain features to protect access to private services and sensitive information maintained by an organization. Sensitive information may be stored in a structured form such as a database, a spreadsheet, etc., and may include, for example, customer, employee, patient or pricing data. In addition, sensitive information may include unstructured data such as design plans, source code, financial reports, human resources reports, customer or patient reports, pricing documentation, corporate mergers and acquisitions documentation, government (e.g. Securities and Exchange Commission) filings, and any other sensitive information that requires restricted user access. In one embodiment, network security may be implemented by intelligence center 120, and a series of one or more security gateways 112, 134, 144 and one or more security blades 155, 156, 157, 158.

The security features may protect confidential information using policies, which may be controlled by policy manager 122 in intelligence center 120. In one embodiment, intelligence center 120 may be a computing system or a series of computing systems managed, for example, by the organization which manages corporate network 130. In one embodiment, intelligence center 120 may be separate from corporate network 130 as shown, however, in other embodiments, intelligence center 120 may be implemented using computing resources inside corporate network 130. Additional details of policy manager 122 are provided below with respect to FIGS. 2A and 2B.

The design of the security features may allow a user or system administrator to define, aggregate and enforce identity, device, information and service centric policies in a uniform, consistent fashion irrespective of whether a user accesses a cloud service with their personal or corporate credentials, from a managed or unmanaged device, from a known or unknown network, or for personal or corporate related purposes. The system combines a cloud federated single sign-on (SSO) solution with the information gateways 112, 134, 144 and security blades 155, 156, 157, 158 and the capability to grant or decline cloud service access and/or information access/transfer/transformation based on an individual's validated identity, device and network context (e.g. managed device through an unknown network), information classification policy context and the cloud service context (e.g. web portal vs. financial management application).

The information gateways 112, 134, 144 and security blades 155, 156, 157, 158 may serve as policy enforcement points to enforce the policies set by policy manager 122. For example, a request to access a cloud service, such as private cloud service 132 or public cloud service 142, may be passed through one of the information gateways. The information gateway may compare the request to the conditions of the applicable policy, and enforce an action based on the result of the comparison. The action may include, for example, allowing the request, denying the request, modifying the request, or some other action. In one embodiment, network architecture 100 may include one or more information gateways located at various different locations. For example, information gateway 112 may be connected to or be a part of network 106. Communication between the user devices 102, 104 and corporate network 130 and public cloud 140 may be enabled via any communication infrastructure. One example of such an infrastructure includes a combination of a wide area network (WAN) and wireless infrastructure, which allows a user to access the could services. The wireless infrastructure may be provided by one or multiple wireless communications systems. In one embodiment, the wireless communication system may be a wireless fidelity (WiFi) hotspot connected with the network 106. The wireless communication system may also be a wireless carrier system that can be implemented using various data processing equipment, communication towers, etc. Alternatively, or in addition, the wireless carrier system may rely on satellite technology to exchange information with the user devices 102, 104. Information gateway 112 may implemented as part of this infrastructure, such that all communications are able to be intercepted by the gateway 112.

In another embodiment, information gateways may be alternatively or additionally located within corporate network 130, such as gateway 134, and within public cloud 140, such as gateway 144. In addition, cloud services, including private cloud services 132 and public cloud services 142, may include security blades 155, 156, 157, 158, as shown. Security blades 155, 156, 157, 158 may be embedded with the associated cloud service and provide enforcement for the access policies provided by policy manager 122 and/or cloud service specific policies defined by the cloud service provider (and provided by policy manager 122). Since all network traffic passes through one of the gateways or security blades, during peak times of high traffic, a bottleneck may form reducing response times. Placing the gateways 134, 144 within corporate network 130 and public cloud 140 respectively, and security blades within the cloud services can alleviate this bottleneck, because the amount of traffic passing through each gateway or security blade is reduced. For example, gateway 134 need only handle traffic intended for private cloud services 132 and gateway 144 need only handle traffic intended for public cloud services 142. Similarly, security blade 155 need only handle traffic intended for its private cloud service 132 and security blade 157 need only handle traffic intended for its public cloud service 142. In addition, the security blades 155, 156, 157, 158 located within the cloud services allow for uniform enforcement of access policies defined by policy manager 122, despite separate management and/or creation of the cloud services. Also, the uniform enforcement prevents a user or system administrator from having to individually set cloud and information security controls at each cloud service, which may be difficult and time consuming in a large system. Additional details of information gateways 112, 134, 144 and security blades 155, 156, 157, 158 are provided below with respect to FIGS. 3 and 4, respectively.

Figure 2A:
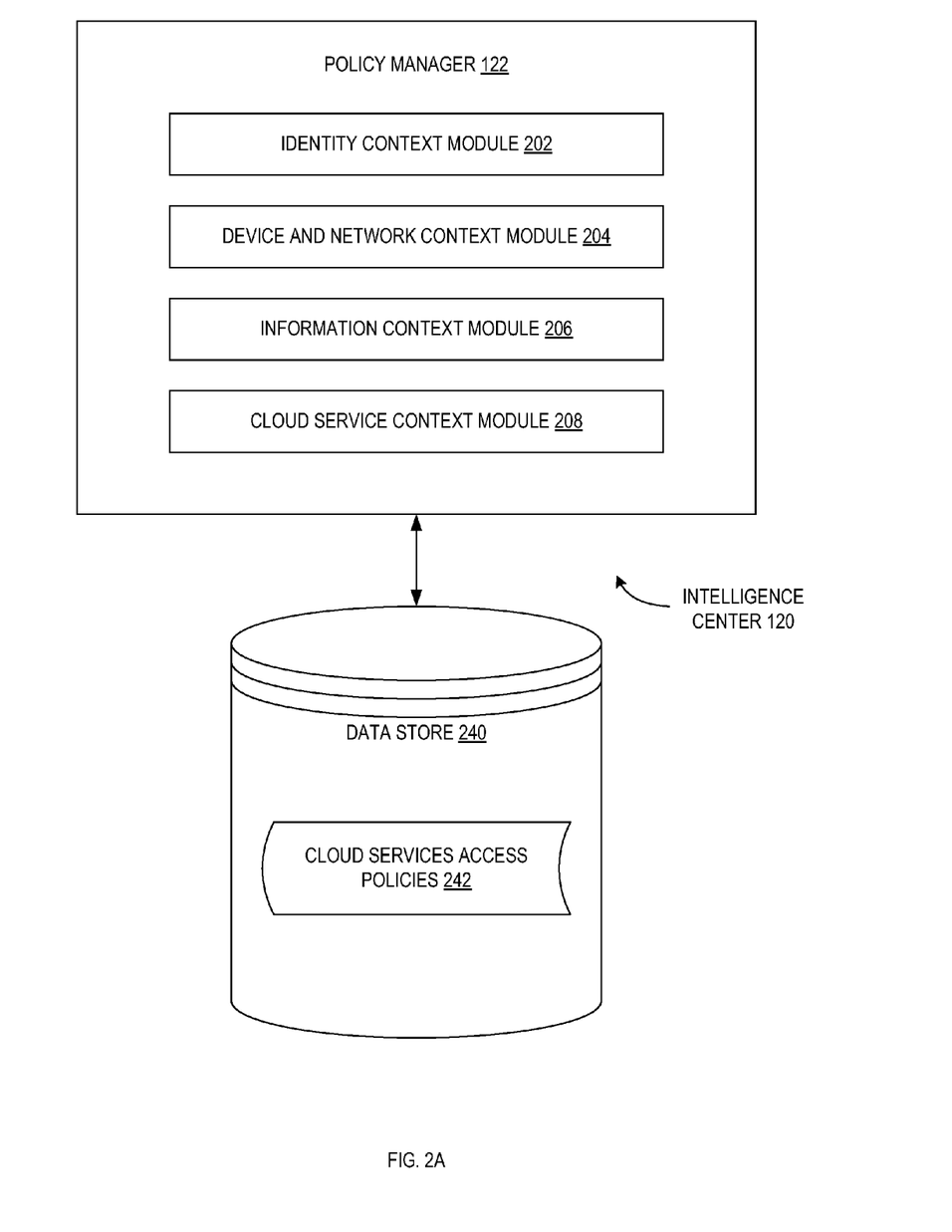
FIG. 2A is a block diagram illustrating a cloud and information security policy manager, according to an embodiment.

FIG. 2A is a block diagram of one embodiment of policy manager 122 that is included in intelligence center 120. In one embodiment, policy manager 122 may include identity context module 202, device and network context module 204, information context module 206, and cloud service context module 208. In one embodiment, policy manager 122 is connected to a data store 240, which may be a file system, database or other data management layer resident on a data storage device such as a disk drive, RAM, ROM, database, etc.

Policy manager may be responsible for defining and managing a set of policies defining access to the various cloud services in a network, such as private could services 132 and public could services 142. The resulting policies may be stored in data store 240, for example, as cloud services access policies 242. The policies 242 may be specifically defined for certain access requests or indirectly defined based on a number of factors or contexts. For example, a request that has a certain combination of factors may be treated according to a certain policy. The policies 242 may be created or defined, for example, by a user, system administrator, or other person or entity.

Identity context module 202 is concerned with the identity of the user making a request to access a cloud service and/or cloud information. Regardless of the device used to make the request (e.g., managed user device 102 or unmanaged user device 104), a user may identify himself using login credentials. The login credentials may include, for example, a user name and password. In one embodiment, the login credentials are part of a single sign-on (SSO) system. SSO is a property of access control of multiple related, but independent software systems (e.g., private cloud services 132 and public cloud services 142). With SSO, the user logs in once and gains access to all (or a certain subset) of the services without being prompted to log in again at each of them. As different services may support different authentication mechanisms, using SSO, the security gateway may internally translate and store different credentials compared to what is used for the initial SSO login.

In one embodiment, the login credentials provided by the user may vary depending on his status. For example, the user may have a certain user name or login if he is a member of a first group, such as being an employee of the corporation that manages corporate network 130. If the user is not a member of the first group, he may have a different set of login credentials, identifying him as such. In addition, the login credentials may provide other information about the user, such as rank, title, position, or other information. Identity context module 202 may interpret different forms of login information to determine the associated identity of a user with those login credentials, and define a corresponding policy. For example, in one embodiment, only users who are employees of the corporation may be allowed to access private cloud services 132, while non-employees are denied access.

Device and network context module 204 is concerned with the type and status of device and network from which a request to access a cloud service is made. As discussed above, user devices are generally categorized as managed user devices 102 or unmanaged user devices 104, including publicly shared user devices. The corporation, or other organization, may have some element of control over managed user device 102, such as requiring that some security software be installed on the managed user device 102, such as security agent 124. Security agent 124 may ensure that the information transferred to and from managed user device 102 is safe and secure. Thus, in one embodiment, device and network context module 204 may define a policy that allows any communication from a managed user device 102 to private or corporate cloud services 132. Requests to access cloud services from an unmanaged user device 104 may be denied, according to the policy. In another embodiment, the policy may dictate that such requests from unmanaged user devices 104 be additionally encrypted or otherwise secured.

The network 106 through which the request to access a cloud service is made may also be considered by device and network context module 204. Network 106, may be for example, a secured or unsecured LAN, a WAN, a mobile telecommunications network, or some other network. Device and network context module 204 may define certain access policies 242 based on the type of network as well. For example, only requests from secure networks may be granted access to private cloud services 132. In another embodiment, the location of the network may also be considered when defining the policy. For example, a request made over a wireless network in the United States may be allowed access to certain cloud services, while a request made over a wireless network in Europe may only be granted for a different set of cloud services.

Information context module 206 is concerned with the type of information which is requested to or sent from a cloud service. The information may be classified in any number of different ways, such as corporate or personal, confidential or public, critical or non-critical, etc. Information context module 206 may define certain access policies 242 based on the type of information being communicated. Each of the different contexts, including the information context, may be combined with one or more other contexts when defining the policies 242. In one embodiment, with respect to the information context, a policy may allow corporate data only to be received by a managed user device 102 or sent only to an employee of the corporation.

Cloud service context module 208 is concerned with the type of cloud service for which access is requested. As discussed above, cloud services are generally categorized as private cloud services 132 or public cloud services 142. Private cloud services 132 may include services created by the organization that manages corporate network 130 (e.g., the corporation) and/or services created by a third party, but provided and managed by the corporation for its users (e.g., employees). Public cloud services 142 may include services created, provided and managed by a variety of different organizations or service providers. The cloud service context may also be affected by the type of service requests (e.g., read, write, delete) as well as a service subdomain (e.g., the scope of the requested information) as determined by a more granular URL or URI. The policies 242 may allow access to the different cloud services based on any combination of one or more of the other contexts. For example, a policy may only allow access to private cloud services 132 from a managed user device 102 or over a secured network. One of skill in the art would recognize that there are many other possible combinations that could form the policies beyond those described herein.

In one embodiment, policy manager 122 creates and manages the policies, such as cloud services access policies 242 and distributes them to the policy enforcement points (e.g., gateways 112, 134, 144 and security blades 155, 156, 157, 158). The policies may be sent to the enforcement points periodically, according to a predefined schedule, each time a change or update is made to one of the policies 242, or in response to a request from a user or system administrator. This may ensure that the gateways 112, 134, 144 and security blades 155, 156, 157, 158 are able to make access decisions based on the most recent up-to-date policies.

Figure 2B:
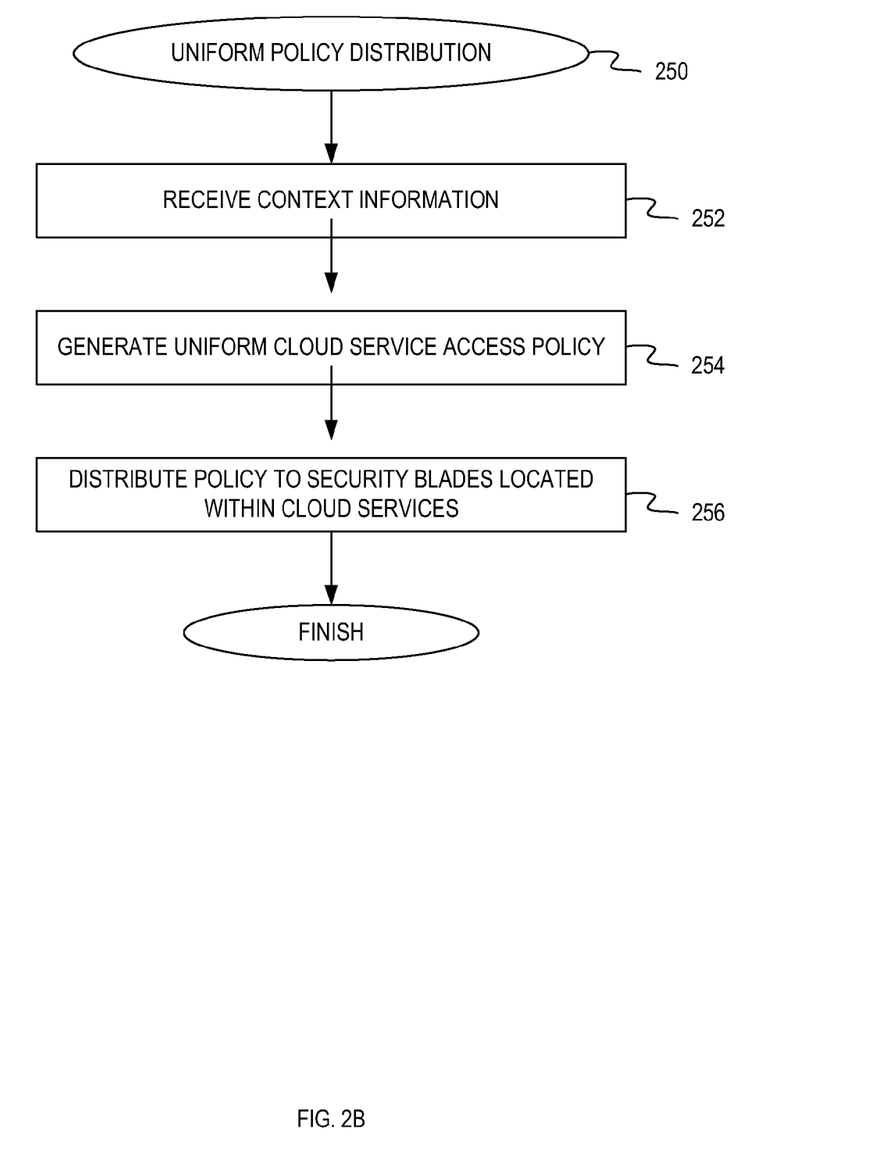
FIG. 2B is a flow diagram illustrating a uniform policy distribution method, according to an embodiment.

FIG. 2B is a flow diagram illustrating a uniform policy distribution method, according to an embodiment of the present invention. The method 250 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate and distribute uniform cloud service access policies to one or more security blades located within the cloud services. In one embodiment, method 250 may be performed by policy manager 122, as shown in FIG. 2A.

Referring to FIG. 2B, at block 252, method 250 receives context information from a system user or administrator. In one embodiment, policy manager may receive context information pertaining to identity, device and network, information, and cloud services. At block 242, corresponding modules 202, 204, 206 and 208 within policy manager 122 may generate a cloud services access policy 242 based on the received context information. The policies 242 may allow access to the different cloud services based on any combination of one or more of the other contexts. For example, a policy may only allow access to private cloud services 132 from a managed user device 102 or over a secured network. One or more sets of different cloud services access policies may be generated by policy manager 122.

At block 256, method 250 distributes the cloud services access policies 242 to security blades within the cloud services. The security blades 155, 156, 157, 158 may be located within private cloud services 132 or public cloud services 142 and may serve as enforcement points for the policies 242. The cloud services access policies may be distributed to one or more cloud services at the discretion of the user of system administrator and thus, may provide uniform enforcement across cloud services that are owned, managed, or created by various different entities. In one embodiment, policy manager 122 may provide a common application programming interface (API) to the plurality of security blades 155, 156, 157, 158, that the security blades may call to receive the updated policy 242. This allows for uniform access decisions while at the same time, distributing the decision making process so as to alleviate bottlenecking at other points in the network. Cloud service providers can control and drive their access policies from a central cloud service policy manager, while getting the benefit of provider-side security and protection enforcement for improved security, performance and scale.

Figure 3:
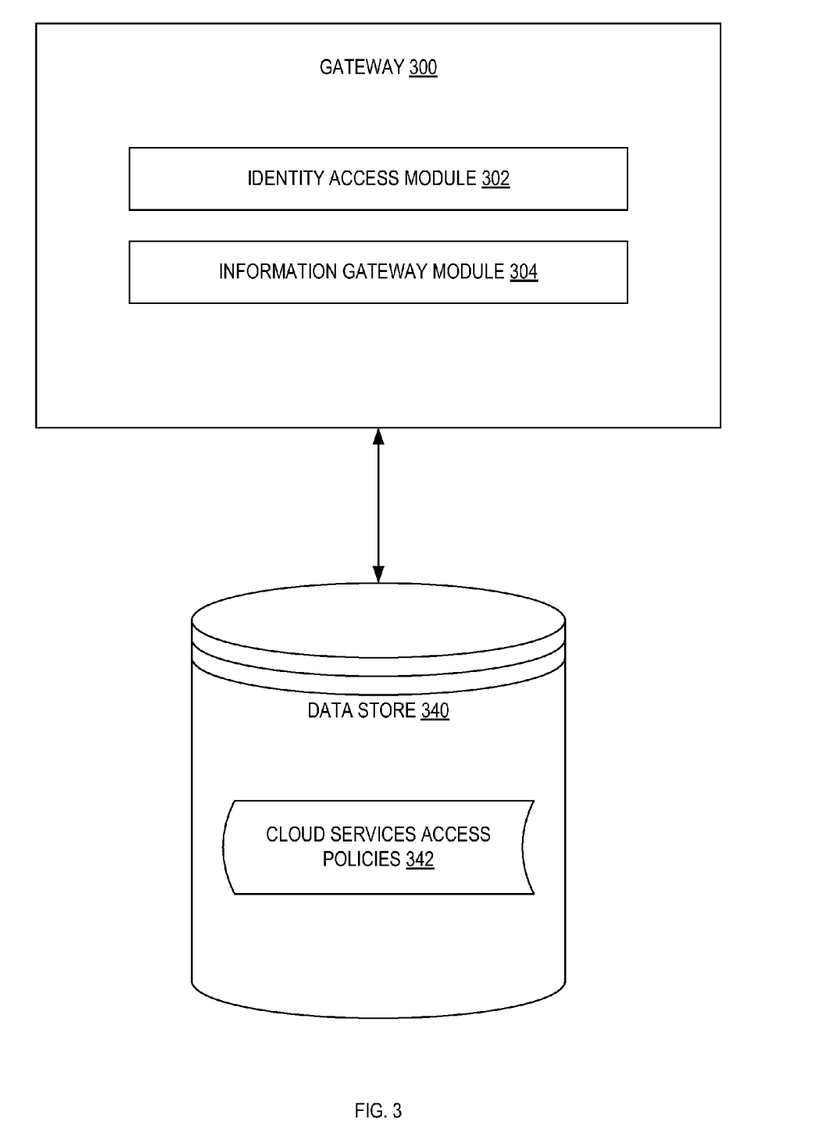
FIG. 3 is a block diagram illustrating a cloud and information security gateway, according to an embodiment.

FIG. 3 is a block diagram illustrating a cloud and information security gateway, according to an embodiment of the present invention. In one embodiment, gateway 300 may include identity access module 302, and information gateway module 304. Cloud and information security gateway 300 may be representative of any of information gateways 112, 134, 144, as shown in FIG. 1, and may be located, for example, in network 106, corporate network 130, public cloud 140, in a cloud service, such as public cloud service 142, or elsewhere. In one embodiment, gateway 300 is connected to a data store 340, which may be a file system, database or other data management layer resident on a data storage device such as a disk drive, RAM, ROM, database, etc.

In one embodiment, gateway 300 may intercept or otherwise receive an access request. The request may be sent, for example, by managed user device 102 or unmanaged user device 104 to access a cloud service, such as private cloud service 132 or public cloud service 142. In one embodiment, the request may include information about the request, such as an identity of the user making the request, information about the device and network from which the request was made, including security information from the user device, a type of information being transmitted or requested, an indication of the cloud service to which the request is directed, and/or other information. Gateway 300 may use this information to make an access determination according to one or more access policies, such as cloud services access policies 342, which may be stored in data store 340. Cloud services access policies 342 may be generated and distributed by a policy manager, such as policy manager 122, in intelligence center 120.

Upon receiving the access request, identity access module 302 examines the request and makes a determination of which of cloud services access policies 342 are applicable. In one embodiment, identity access module 302 identifies an identity of the user making the request, information about the device from which the request was made, including security information from the user device and information about the network on which the request was received. In response, identity access module 302 may determine if the request should be allowed for a given cloud service according to the policies 342. For example, identity access module 302 may determine that the request is received from an employee of the corporation, on a managed device, such as managed user device 102, and received on a secure wireless network 106. The policy 342 may dictate that a request with that particular combination of features should be allowed for either private cloud services 132 or public cloud services 142. In one embodiment, the policy 342 may specify individual cloud services that may or may not be accessed, rather than just a class of services.

In one embodiment, either before or after, or in some cases at the same time that identity access module 302 verifies the identity of the request, information gateway module 304 may examine the request and make a determination of whether to allow the request based on policies 342. Information gateway module 304 may identify a type of information that the access request is either sending to a cloud service or requesting from the cloud service. The information may be classified in any number of different ways, such as corporate or personal, confidential or public, critical or non-critical, etc. For example, information gateway module 306 may determine that the user is attempting to download corporate sales data from a private cloud service 132. In one embodiment, the policy 342 may specify that such information is allowed to be downloaded by corporate employees, or by anyone using a managed user device 102, or by some combination of these or other factors.

Figure 4:
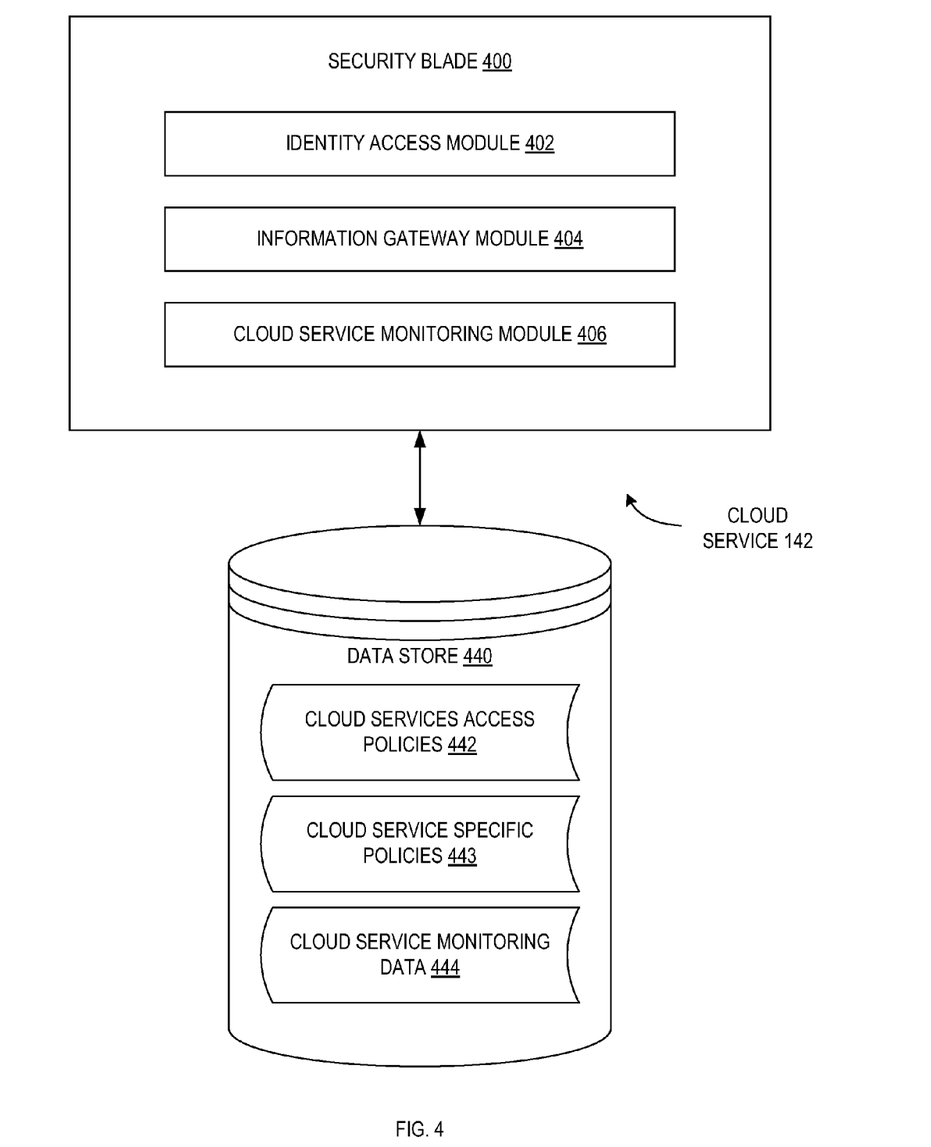
FIG. 4 is a block diagram illustrating a cloud and information security blade, according to an embodiment.

FIG. 4 is a block diagram illustrating a cloud and information security blade, according to an embodiment of the present invention. In one embodiment, security blade 400 may include identity access module 402, information gateway module 304 and cloud service monitoring module 406. Security blade 400 may be representative of any of security blades 155, 156, 157, 158, as shown in FIG. 1, and may be located, for example, in a cloud service, such as private cloud service 132, public cloud service 142, or elsewhere. In one embodiment, security blade 400 is connected to a data store 440, which may be a file system, database or other data management layer resident on a data storage device such as a disk drive, RAM, ROM, database, etc.

In one embodiment, security blade 400 may intercept or otherwise receive an access request. The request may be sent, for example, by managed user device 102 or unmanaged user device 104 to access a cloud service, such as private cloud service 132 or public cloud service 142. In one embodiment, the request may include information about the request, such as an identity of the user making the request, information about the device and network from which the request was made, including security information from the user device, a type of information being transmitted or requested, an indication of the cloud service to which the request is directed, and/or other information. Security blade 400 may use this information to make an access determination according to one or more access policies, such as cloud services access policies 442, which may be stored in data store 440. Cloud services access policies 442 may be generated and distributed by a policy manager, such as policy manager 122, in intelligence center 120.

In one embodiment, security blade 400 may be a software component embedded within a cloud service or may be included as a plug-in. As a plug-in, security blade 400 may add particular security and policy enforcement functions to the cloud service. In one embodiment, security blade 400 may be created by the service provider that developed or manages the cloud service, however in other embodiments, security blade 400 may be created by some other developer, such as the corporation that manages corporate network 130. Security blade 400 may implement security features that are not part of the underlying cloud service. Making security policy enforcement decisions in the blade 400 may distribute the decision making process so as to alleviate bottlenecking at the gateways 112, 134, 144.

Upon receiving an access request, identity access module 402 may examine the request and make a determination of which of cloud services access policies 442 are applicable. In one embodiment, identity access module 402 identifies an identity of the user making the request, information about the device from which the request was made, including security information from the user device and information about the network on which the request was received. In response, identity access module 402 may determine if the request should be allowed for the particular cloud service according to the policies 442. For example, identity access module 402 may determine that the request is received from an employee of the corporation, on a managed device, such as managed user device 102, and received on a secure wireless network 106. The policy 442 may dictate that a request with that particular combination of features should be allowed for either private cloud services 132 or public cloud services 142. In one embodiment, the policy 442 may specify individual cloud services that may or may not be accessed, rather than just a class of services. In one embodiment, policy manager 122 only provides policies 442 to security blade 400 that are applicable to the underlying cloud service 142.

In one embodiment, either before or after, or in some cases at the same time that identity access module 402 verifies the identity of the request, information gateway module 404 may examine the request and make a determination of whether to allow the request based on policies 442. Information gateway module 404 may identify a type of information that the access request is either sending to a cloud service or requesting from the cloud service. The information may be classified in any number of different ways, such as corporate or personal, confidential or public, critical or non-critical, etc. For example, information gateway module 406 may determine that the user is attempting to download corporate sales data from a private cloud service 132. In one embodiment, the policy 442 may specify that such information is allowed to be downloaded by corporate employees, or by anyone using a managed user device 102, or by some combination of these or other factors.

In addition to cloud services access policies 442, which may be received from policy manager 122, identity access module 402 and information gateway module 404 may make access determinations based on cloud service specific policies 443. Cloud service specific policies 443 may be policies dictated specifically by the cloud service provider, rather than by the organization or corporation that manages intelligence center 120. For example, cloud service specific policies 443 may implement a role-based access control (RBAC) system where user identities or devices, determined by identity access module 402, may be assigned to certain roles. The roles may have corresponding access rights defined by the cloud service provider. In one embodiment, these rights may take precedence over any access granted by cloud services access policies 442, however in another embodiment, cloud services access policies 442, may take priority.

In one embodiment, cloud service monitoring module 406 monitors requests for access to the underlying cloud service 142 and logs or otherwise maintains a record of such requests. Cloud service monitoring module 406 may store the logs as cloud service monitoring data 444 in data store 440. Cloud service monitoring module 406 may store information about the received requests, such as for example, the identity of the user making the request, the device and network on which the request was made, what information was requested, or other information as cloud service monitoring data 444. In one embodiment, cloud service monitoring data 444 captured by security blade 400, may be combined with similar data collected by other security blades and made available to other services for consolidated analysis and/or compliance reporting.

Figure 5:
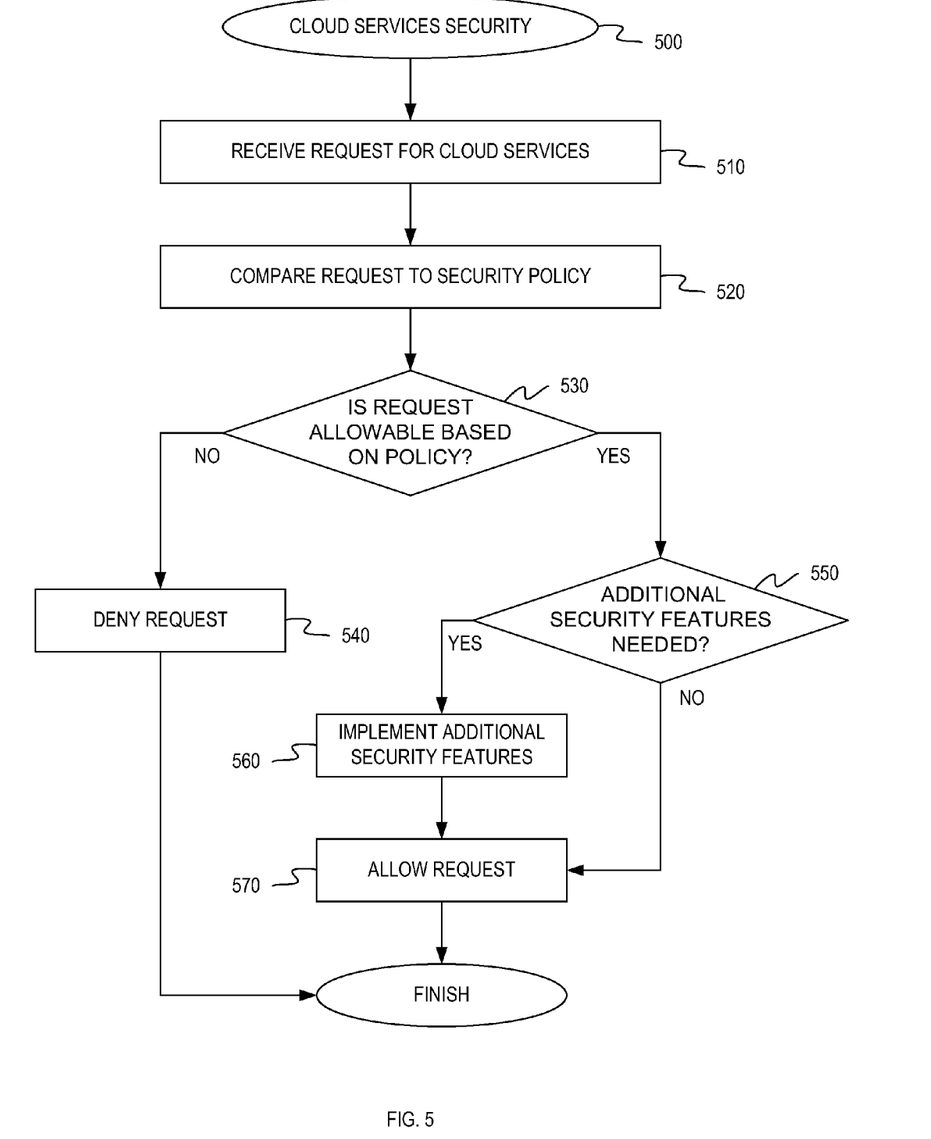
FIG. 5 is a flow diagram illustrating a cloud services security method, according to an embodiment.

FIG. 5 is a flow diagram illustrating a cloud services security method, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud services made by user devices. In one embodiment, method 500 may be performed by security blade 400, as shown in FIG. 4.

Referring to FIG. 5, at block 510, method 500 receives a request to access cloud services. In one embodiment, the request may be sent by a user device, such as managed user device 102 or unmanaged user device 104. The request may be for access to a cloud service, such as private cloud services 132 or public cloud services 142. In one embodiment security blade 400, which may include for example one of blades 155, 156, 157, or 158, may intercept or otherwise receive the access request of the user device.

At block 520, method 500 may analyze the request based on a set of one or more security policies, such as cloud services access policies 442. Cloud services access policies 442 may include policies generated and distributed by a policy manager, such as policy manager 122 in intelligence center 120. The policies 442 may be sent to security blade 400 periodically, according to a predefined schedule, each time a change or update is made to one of the policies, or in response to a request from a user or system administrator.

At block 530, method 500 determines whether the request is allowable based on the cloud services access policy 442. In one embodiment, identity access module 402 of security blade 400 determines an identity of the user making the request, information about the device from which the request was made and information about the network on which the request was received. In response, identity access module 402 may determine if the request should be allowed for a given cloud service according to the policy 442 or cloud services specific policies 443. For example, the policy 442 may specify that a request with a particular combination of features should or shout not be allowed for either private cloud services 132 or public cloud services 142. In addition, information gateway module 404 may identify a type of information that the access request is either sending to a cloud service or requesting from the cloud service. The information may be classified in any number of different ways, such as corporate or personal, confidential or public, critical or non-critical, etc. In one embodiment, the policy 442 may specify that certain types of information are allowed to be downloaded by certain users, devices, etc.

If at block 530, method 500 determines that the access should not be granted for the requested cloud service, at block 540 method 500 may deny the access request. As a result the requesting device is not allowed access to the cloud service. If at block 530, method 500 determines that the access should be granted for the requested cloud services according to policy 442, method 500 proceeds to block 550. At block 550, method 500 determines if additional security features are needed. In one embodiment, the cloud services access policy 442 may specify that a certain level of security is required on the user device 102, 104. If the current security features of the device do not meet the requirements of the policy, at block 560, method 500 implements the additional security features. In one embodiment, method 500 may upgrade the security software on user device 102, install a security agent 124 on user device 102, or otherwise upgrade or improve the device security. If at block 550, method 500 determines that additional security features are not needed, at block 570, method 500 allows the request. Security blade 400 may allow the request for access to be passed through to the underlying cloud service, such as private cloud service 132 or public cloud service 142.

Figure 6:
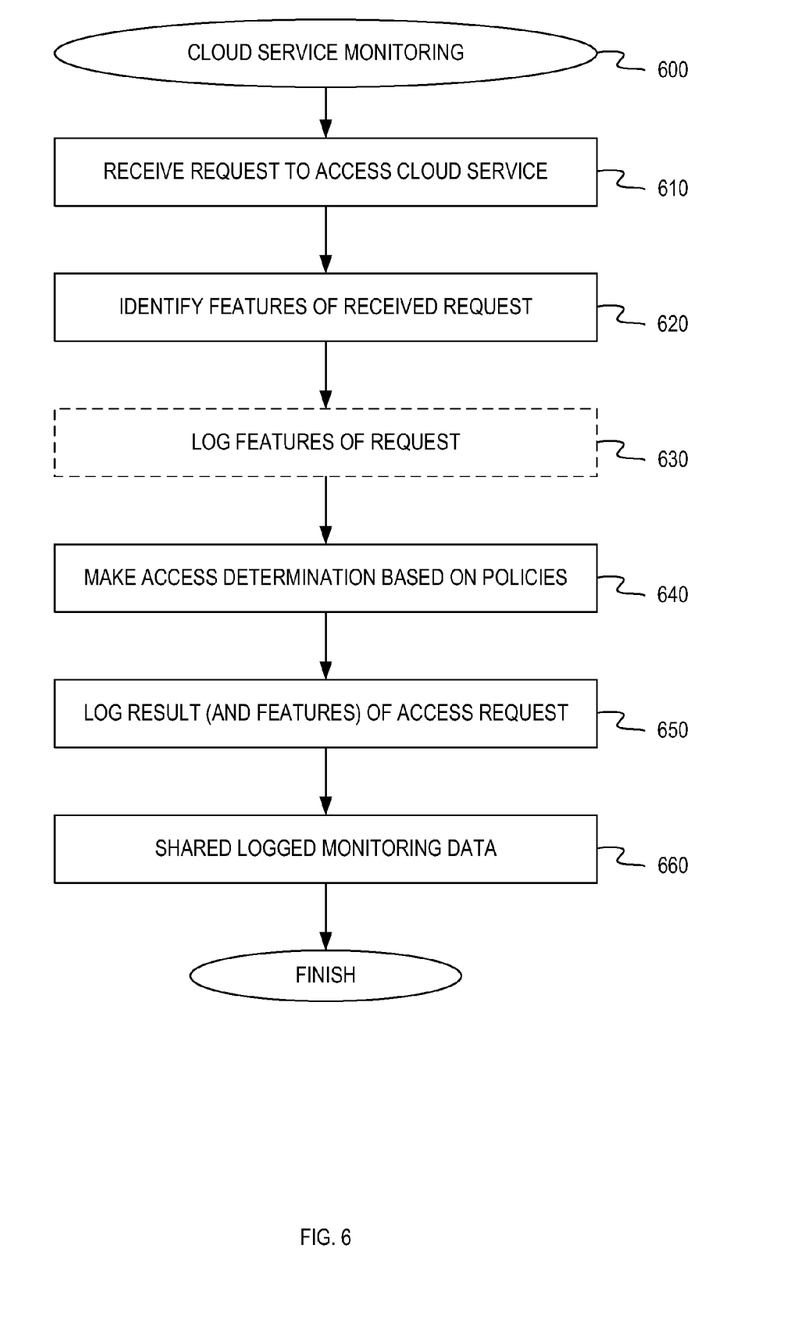
FIG. 6 is a diagram illustrating a cloud services monitoring method for cloud services, according to an embodiment.

FIG. 6 is a flow diagram illustrating cloud and information security method for cloud services, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud services made by user devices. In one embodiment, method 600 may be performed by security blade 400, as shown in FIG. 4.

Referring to FIG. 6, at block 610, method 600 receives a request to access the underlying cloud service. In one embodiment, the request may be sent by a user device, such as managed user device 102 or unmanaged user device 104. The request may be for access to a cloud service, such as a private cloud service 132 or a public cloud service 142. In one embodiment security blade 400, which may include for example one of blades 155, 156, 157, or 158, may intercept or otherwise receive the access request.

At block 620, method 600 identifies features or other information about the received access request. For example, identity access module 402 of security blade 400 may determine an identity of the user making the request, information about the device from which the request was made and information about the network on which the request was received. Information gateway module 404 may identify a type of information that the access request is either sending to the cloud service or requesting from the cloud service. The information may be classified in any number of different ways, such as corporate or personal, confidential or public, critical or non-critical, etc. In one embodiment, identify access module 402 and information gateway module 404 may provide the determined feature information to cloud service monitoring module 406.

At block 630, method 600 may optionally log the features of the request identified at block 620. In one embodiment, cloud service monitoring module 406 may store the information about the request as cloud service monitoring data 444 in data store 440. In another embodiment, method 600 may wait until after an access determination is made to log the features of the received request.

At block 640, method 600 may make an access determination for the request based on one or more cloud service access policies. In one embodiment, security blade 400 determines whether the request is allowable based on the cloud services access policy 442 and any cloud service specific policies 443. In one embodiment, identity access module 402 and information gateway module 404 may compare the identified features to the policies 442 and 443 to determine if the request should be allowed.

At block 650, method 600 logs the result of the access determination from block 640, along with the features of the received request if not already logged at block 630. In one embodiment, cloud service monitoring module 406 may store the results and the information about the request as cloud service monitoring data 444 in data store 440.

At block 660, method 600 may share the logged monitoring data with a central server, such as intelligence center 120, with another security blade in a different cloud service, or with some other entity. In one embodiment, cloud service monitoring data 444 captured by security blade 400, may be combined with similar data collected by other security blades and made available to other services for consolidated analysis and/or compliance reporting.

Figure 7:
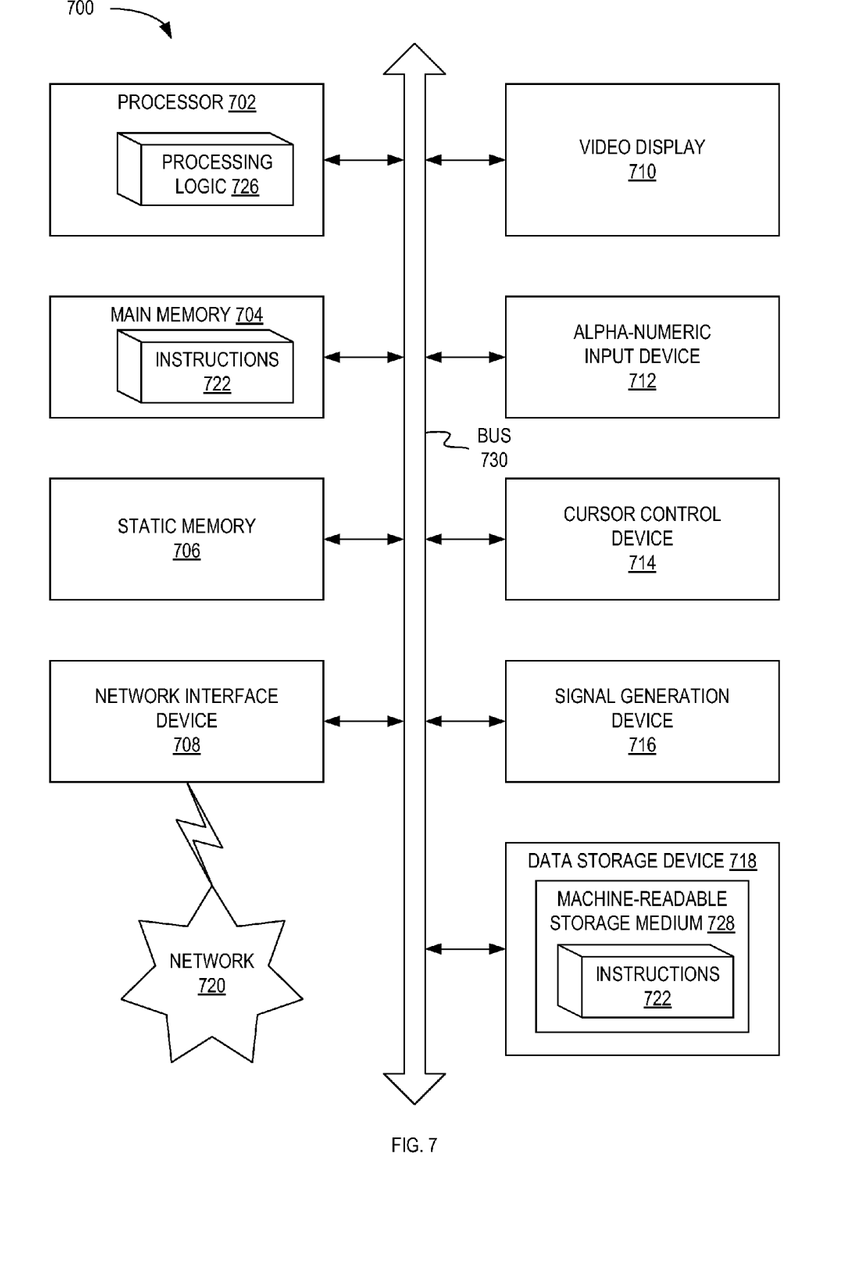
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent intelligence center 120 in FIG. 1, gateway 300 in FIG. 3, and/or security blade 400 in FIG. 4.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 may be configured to execute the information gateway 300 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of gateway 300) embodying any one or more of the methodologies or functions described herein. The instructions 722 may also reside, completely or at least partially, within the main memory 704 and/or within processing logic 726 of the processor 702 during execution thereof by the computer system 700, the main memory 704 and the processor 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "adding," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
generating, by a processor, a uniform cloud service and information security policy based on a plurality of access contexts; and
distributing the uniform cloud service and information security policy to a plurality of security blades, the security blades located within a plurality of cloud services and configured to provide access for a user device to the cloud services and to serve as a policy enforcement point for the uniform cloud service and information security policy, wherein distributing the uniform cloud service and information security policy comprises providing an application programming interface (API) to the plurality of security blades, the security blades to call the API to receive an updated version of the uniform cloud service and information security policy.

2. The method of claim 1, wherein the plurality of cloud services comprises at least one of public cloud services or private cloud services.

3. The method of claim 1, wherein the uniform cloud service and information security policy is generated and distributed by a policy manager.

4. The method of claim 1, wherein the plurality of access contexts comprises at least one of an identity of a user making the request, a type of the user device, a type of network over which the request was received, or a type of information requested.

5. The method of claim 1, further comprising:
receiving the plurality of access contexts from a system administrator.

6. The method of claim 1, wherein the security blades are configured to:
receive a request from the user device to access a corresponding cloud service;
compare a feature of the request to the uniform cloud service and information security policy for the cloud service; and
if the feature satisfies a condition of the policy, grant the user device access to the cloud service.

7. A system, comprising:
a memory; and
a processor coupled with the memory to:
generate a uniform cloud service information and security policy based on a plurality of access contexts; and
distribute the uniform cloud service information and security policy to a plurality of security blades, the security blades located within a plurality of cloud services and configured to provide access for a user device to the cloud services and to serve as a policy enforcement point for the uniform cloud services information and security policy, wherein to distribute the uniform cloud service and information security policy, the processor to provide an application programming interface (API) to the plurality of security blades, the security blades to call the API to receive an updated version of the uniform cloud service and information security policy.

8. The system of claim 7, wherein the plurality of cloud services comprises at least one of public cloud services or private cloud services.

9. The system of claim 7, wherein the uniform cloud service information and security policy is generated and distributed by a policy manager.

10. The system of claim 7, wherein the plurality of access contexts comprises at least one of an identity of a user making the request, a type of the user device, a type of network over which the request was received, or a type of information requested.

11. The system of claim 7, the processor further to:
receive the plurality of access contexts from a system administrator.

12. The system of claim 7, wherein the security blades are configured to:
receive a request from the user device to access a corresponding cloud service;
compare a feature of the request to the uniform cloud service information and security policy for the cloud service; and
if the feature satisfies a condition of the policy, grant the user device access to the cloud service and information contained therein.

13. A non-transitory computer readable storage medium including instructions that, when executed by a processor, cause the processor to perform a method comprising:
generating, by the processor, a uniform cloud service information and security policy based on a plurality of access contexts; and
distributing the uniform cloud service information and security policy to a plurality of security blades, the security blades located within a plurality of cloud services and configured to provide access for a user device to the cloud services and to serve as a policy enforcement point for the uniform cloud services information and security policy, wherein distributing the uniform cloud service and information security policy comprises providing an application programming interface (API) to the plurality of security blades, the security blades to call the API to receive an updated version of the uniform cloud service and information security policy.

14. The non-transitory computer readable storage medium of claim 13, wherein the plurality of cloud services comprises at least one of public cloud services or private cloud services.

15. The non-transitory computer readable storage medium of claim 13, wherein the uniform cloud service information and security policy is generated and distributed by a policy manager.

16. The non-transitory computer readable storage medium of claim 13, wherein the plurality of access contexts comprises at least one of an identity of a user making the request, a type of the user device, a type of network over which the request was received, or a type of information requested.

17. The non-transitory computer readable storage medium of claim 13, wherein the security blades are configured to:
receive a request from the user device to access a corresponding cloud service;
compare a feature of the request to the uniform cloud service information and security policy for the cloud service; and
if the feature satisfies a condition of the policy, grant the user device access to the cloud service.

* * * * *